United States Patent [19]

Aigle et al.

[11] 4,296,453

[45] Oct. 20, 1981

[54] WOUND ELECTRICAL CAPACITOR WITH EXCESSIVE PRESSURE PROTECTIVE DEVICE

[75] Inventors: Karl Aigle; Udo Hieber, both of Heidenheim; Wilhelm Huebscher, Heldenfingen; Hans H. Rheindorf, Herbrechtingen; Rolf Wiedemann, Nattheim, all of Fed. Rep. of Germany

[73] Assignee: Siemens Aktiengesellschaft, Berlin & Munich, Fed. Rep. of Germany

[21] Appl. No.: 39,877

[22] Filed: May 17, 1979

[30] Foreign Application Priority Data

Jun. 9, 1979 [DE] Fed. Rep. of Germany ....... 2825377

[51] Int. Cl.³ .............................................. H01G 1/11
[52] U.S. Cl. ................................... 361/275; 361/274; 361/306; 361/307
[58] Field of Search ............... 361/272, 273, 274, 275, 361/306, 307

[56] References Cited

FOREIGN PATENT DOCUMENTS

| 975024 | 6/1961 | Fed. Rep. of Germany . |
| 2220022 | 11/1973 | Fed. Rep. of Germany . |
| 2402501 | 1/1974 | Fed. Rep. of Germany ...... 361/272 |
| 2444467 | 1/1976 | Fed. Rep. of Germany . |
| 2626148 | 12/1977 | Fed. Rep. of Germany . |
| 586955 | 4/1977 | Switzerland . |
| 712017 | 7/1954 | United Kingdom ............... 361/307 |

*Primary Examiner*—E. A. Goldberg
*Attorney, Agent, or Firm*—Hill, Van Santen, Steadman, Chiara & Simpson

[57] ABSTRACT

A wound electrical capacitor, particularly a power capacitor provided with an excess-pressure break-away structure employing a tubular shaped electric conductor which forms the electric supply line to the capacitor winding and which is disposed within the housing. The conductor has a predetermined break point at which it will break under a tension load applied to it over the housing bottom and a tensioning device, in the presence of an excessive pressure within the housing. The invention is particularly suitable for employment in oil-impregnated, regeneratable power capacitors.

7 Claims, 8 Drawing Figures

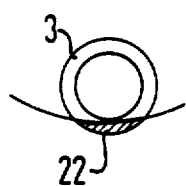  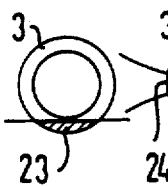 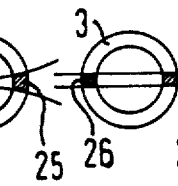 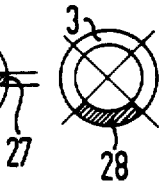 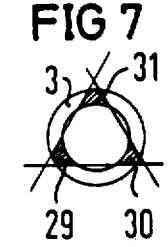 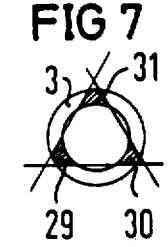
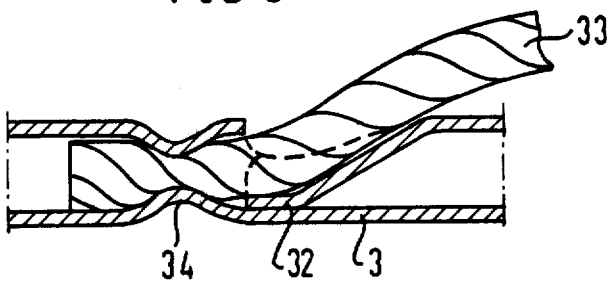

WOUND ELECTRICAL CAPACITOR WITH EXCESSIVE PRESSURE PROTECTIVE DEVICE

BACKGROUND OF THE INVENTION

The invention relates generally to a wound electrical capacitor, particularly power capacitors, which include within the housing a structure adapted to rupture in the presence of an excessive pressure in the housing and thereby interrupt the electric supply to open the capacitor circuit.

In oil-impregnated power capacitors, particularly capacitors having electrodes formed by regeneratable coatings, and which are impregnated with oil, gaseous decomposition products are often formed during operation as a result of the self-healing processes, which decomposition products can produce a strong pressure increase in the interior of the housing. To avoid possible explosion of the housing under such strong pressure increase, which also can occur at the end of the life expectancy of the capacitor, excess-pressure breakaway or interruption protective devices or fuses are commonly employed in such capacitors, which are operative to open the capacitor circuit in the presence of a large internal pressure increase.

Such a structure is disclosed, for example, in German LP No. 975,024, which illustrates a circuit opening arrangement for capacitors which is disposed in the housing and is connected, by soldering, into the wiring as a separate component. A suitable break-away strip is supported between two plates of insulating material and tensioned by means of suitable tensioning members, with the break-away strip possessing a predetermined rated breaking point.

It is also known to employ a break-away wire which possesses a rated breaking point, as the circuit-opening device. However, such a break-away wire is not suitable for employment in power capacitors.

SUMMARY OF THE INVENTION

The invention therefore has one of its principal objectives, the production of a break-away structure, responsive to excessive internal pressure, which is particularly adaptable for employment in power capacitors with regeneratable coatings, in which the supply line itself is designed as the excess current break-away protective device.

This objective is realized, in accordance with the invention, by the disposition of a tubular shaped electrical conductor within the housing, which conductor possesses a cross-sectional reduction, produced by the removal of the tube material at a desired location, which forms the rated break point.

In accordance with a further development of the invention, a fine-stranded conductor, forming the electrical connection to the winding, may be secured to the tubular shaped electrical conductor by inserting the stranded conductor into a portion of the tubular conductor and crimping the latter onto the stranded conductor.

BRIEF DESCRIPTION OF THE DRAWINGS

In the drawings wherein like reference characters indicate like or corresponding parts:

FIGS. 2 through 7 illustrate different cross-sectional configurations of a tubular electrical conductor, such as illustrated in FIG. 1, corresponding approximately to a section taken on the line II–VII of FIG. 1; and FIG. 8 illustrates a portion of such a tubular shaped electrical conductor, showing the connection of a stranded conductor thereto.

DETAILED DESCRIPTION

Figure 1:
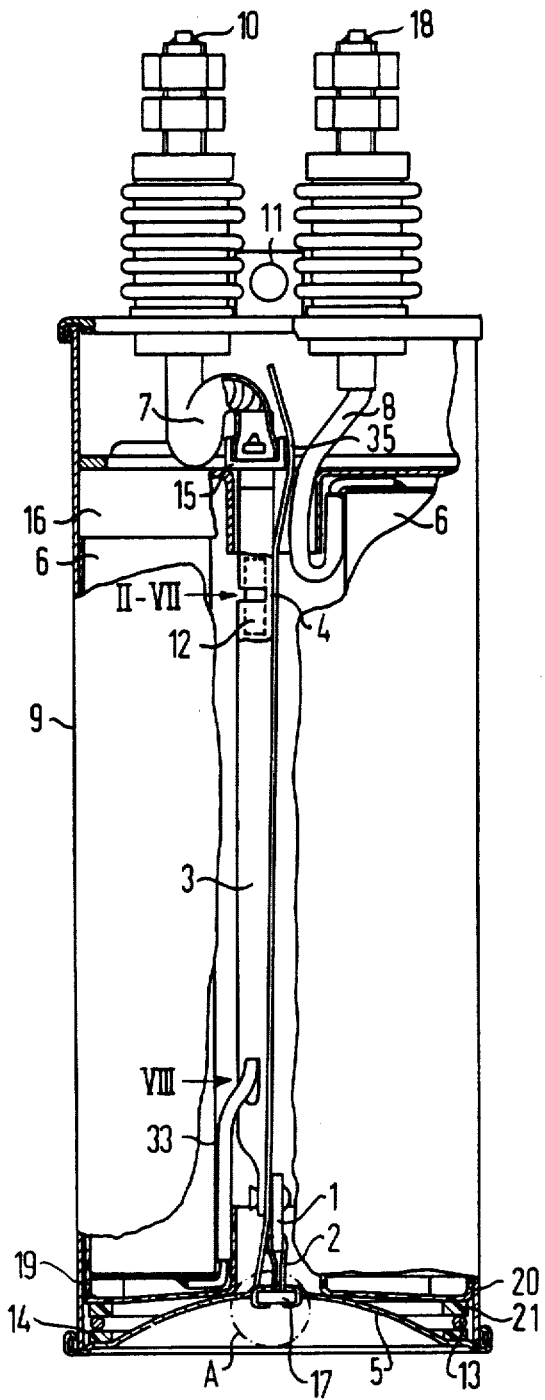
FIG. 1 illustrates a capacitor in accordance with the invention, with portions of the housing broken away to show the internal details thereof.

Referring to the drawings and more particularly to FIG. 1, the reference numeral 9 designates generally a housing having a bottom 5 and an upper top member, which carries two terminals 10 and 18, as well as a housing terminal 11.

The housing 9 contains a capacitor winding 6, one side of which is connected to the terminal 10 by means of an insulated feed conductor 7 which extends from the terminal 10 to a tubular conductor 3 which in turn is connected to the winding 6 by a conductor 33. The oppoiste side of the winding 6 is operatively connected to the terminal 18 by a bare, uninsulated conductor 8. The tubular shaped conductor (hereafter referred to as the rigid conduit) is connected at its bottom end, as illustrated in FIG. 1, by an insulated tensioning device 1 riveted to the rigid conduit 3 and a tensioning strap 2 which is anchored in the bottom 5 of the housing 9 by means of a cap 17.

The upper end of the rigid conduit 3 is retained by a stirrup 15 which is pushed over the upper end of the rigid conduit 3 and secured thereto, without play and without tension directly above the stirrup 15, by means of a crimping of the upper tube end. The stirrup 15 is insulated from the adjacent portions of the winding 6 by means of a cap member 16 of insulating material, and from the feed line 8 by means of a strip 35 of insulating material. Insulating caps 19 and 20, which provide winding-housing insulation, are disposed at the housing bottom 5 which is supported by means of rings 14 and 21 in cooperation with a resilient ring 13.

As illustrated in FIG. 1, the rigid conduit 3 is provided with a break-away point 4, illustrated as being formed by the removal of the material of the conduit by a suitable cutting or sawing action, thereby materially reducing the cross-sectional area of material connecting the portions of the rigid conduit at opposite sides of such slots.

Upon the existence of an excessive pressure within the housing 9, the housing bottom 5 will buckle outwardly, i.e. downwardly as viewed in FIG. 1, to exert tensioning forces on the rigid conduit 3 over the tensioning device 1 and the tensioning strap 2, ultimately resulting in breakage of the conduit at the rated break point.

To provide stability in the rigid conduit 3 in the vicinity of the cross-sectional reduction 4, a reinforcing member 12 can be inserted into the conduit 3, or the latter can be reinforced at such locations by an external sleeve or tubular member (not shown) carried by the conduit 3 at the exterior thereof and spanning the portion 4.

FIGS. 2 through 7 illustrate cross-sectional configurations, taken approximately on a line corresponding to the line II–VII of FIG. 1, also illustrating how such reductions can be produced by the removal of material of the rigid conduit 3, for example by means of sawing, cutting, etc. from one or more sides of the member. Thus, FIGS. 2, 3 and 6 illustrate operations to produce a single portion of reduced cross-sectional area while FIGS. 4 and 5 illustrate the reduction of two such portions, and FIG. 7, three such portions.

Likewise, the conduit may be compressed flat at the desired break point and the cross-sectional reduction achieved by means of a stamping operation.

In a multiple winding construction, it is also advantageous to design the counter-line as a rigid conduit.

FIG. 8 illustrates the details of the connection of the capacitor winding to the rigid conduit 3, which in this construction is slit at the desired location by means of a suitable stamping operation and the adjacent portion of the conduit at one side of the stamping operation deformed inwardly to form an opening for a fine-stranded conductor 33, which is then rigidly connected to the conduit 3 by a suitable crimping operation 34.

Preferably, both the rigid conduit 3 as well as the conductor 33 are formed from copper, and considering the skin effect, a smaller ohmic resistance results in an advantageous manner for the rigid conduit 3 than in the case of a solid material ($R_o \approx 0.5 \cdot R_\bullet$ at 3 kHz).

In addition, the rigid conduit 3 exhibits a better heat dispersion and at the same time has a high mechanical stability. By the utilization of copper, a good workability by stamping, sawing, or crimping operations is achieved, whereby relatively expensive soldering connections can be avoided.

Having thus described our invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. In a wound electrical capacitor, particularly a power capacitor, which is enclosed in a housing provided with an excess-pressure break-away structure, the combination of a hollow tubular electric conductor means mounted within the housing electrically connected to the capacitor and mechanically connected to the housing for the subjection of tension loads thereon in the presence of excessive pressure in the housing, said electrical conductor means having a localized cross-sectional reduction in material at a predetermined location which constitutes a rated break point, and reinforcing means at the break point to prevent accidental rupture of the break point except by said tension loads.

2. An electrical capacitor according to claim 1, wherein a fine-stranded conductor and the tubular conductor means form the electrical connection to the capacitor winding with such fine-stranded conductor extending into the tubular electrical conductor means and the latter being crimped upon such stranded conductor to secure the latter thereto.

3. An electrical capacitor according to claim 1, wherein said localized cross-sectional reduction is formed by at least one transversely extending slot in the tubular conductor means, with the remaining material spanning such slot defining the rated break point.

4. An electrical capacitor according to claim 3, wherein said localized cross-sectional reduction is formed by a plurality of slots lying in a common plane extending transversely to the axis of said tubular conductor means to form a plurality of circumferentially spaced portions spanning such slots which portions cooperably form the rated break point.

5. An electrical capacitor according to claim 1 wherein said reinforcing means comprises a reinforcing member within the tubular conductor.

6. An electrical capacitor according to claim 1 wherein said reinforcing means comprises a sleeve surrounding an outside portion of the tubular conductor.

7. In a wound electrical power capacitor enclosed in a housing having an excess-pressure break-away structure, the combination of a hollow tubular electrical conductor means mounted within the housing electrically connected to the capacitor and mechanically connected to the housing for the subjection of tension loads thereon in the presence of excessive pressure in the housing, said electrical conductor means having a localized cross-section of reduction in material at a predetermined location which constitutes a rated break point, reinforcing means at the break point to prevent accidental rupture of the break point except by said tension loads, and a stranded conductor having one end connected to the capacitor winding at the other end connecting to the tubular conductor means by insertion through a slot of the tubular conductor means and crimping of the conductor means upon the stranded conductor to secure the latter.

* * * * *